(12) United States Patent
Goodman et al.

(10) Patent No.: US 10,843,097 B2
(45) Date of Patent: Nov. 24, 2020

(54) KITE LEADING EDGE AND SPORTS KITE

(71) Applicant: Neil Pryde Limited, Hong Kong (CN)

(72) Inventors: Patrick S. Goodman, Miaoli County (TW); David Aberdeen, Indooroopilly (AU)

(73) Assignee: Neil Pryde Limited, Hong Kong (CN)

(*) Notice: Subject to any disclaimer, the term of this patent is extended or adjusted under 35 U.S.C. 154(b) by 324 days.

(21) Appl. No.: 16/021,388

(22) Filed: Jun. 28, 2018

(65) Prior Publication Data

US 2019/0091593 A1    Mar. 28, 2019

(30) Foreign Application Priority Data

Jun. 28, 2017  (HK) .................................. 17106492

(51) Int. Cl.
*B64C 31/06* (2020.01)
*A63H 27/08* (2020.01)
*B63H 8/10* (2020.01)

(52) U.S. Cl.
CPC .............. *A63H 27/085* (2013.01); *B63H 8/10* (2020.02); *B64C 31/06* (2013.01); *B64C 2031/065* (2013.01)

(58) Field of Classification Search
CPC ........ A63H 27/085; B63H 8/10; B63H 9/069; B64C 31/06; B64C 31/028; B64C 2031/065
See application file for complete search history.

(56) References Cited

U.S. PATENT DOCUMENTS

| | | | | |
|---|---|---|---|---|
| 2004/0195435 A1* | 10/2004 | Logosz | ................... | B64C 31/06 244/15 |
| 2005/0230556 A1* | 10/2005 | Legaignoux | ............. | B63H 8/12 244/153 R |
| 2009/0179112 A1* | 7/2009 | Gu | .......................... | B64C 31/06 244/153 R |
| 2009/0277997 A1* | 11/2009 | Shogren | .................. | B63H 8/10 244/153 R |
| 2012/0193482 A1* | 8/2012 | Harrington | ............. | B64C 31/06 244/153 R |
| 2014/0070055 A1* | 3/2014 | Stiewe | ................... | B64C 31/06 244/155 A |

* cited by examiner

*Primary Examiner* — Richard G Davis
(74) *Attorney, Agent, or Firm* — Leydig, Voit & Mayer Ltd.; John Augustyn

(57) ABSTRACT

A kite leading edge has a tubular structure having a first curve in a span-wise direction and a second curve a chord-wise direction. The tubular structure is formed by a plurality of panels joined together at seams including at least a first longitudinal seam running in the span-wise direction of the tubular structure. At least a portion of the first longitudinal seam defines a first partial helical path about the circumference of the tubular structure.

20 Claims, 7 Drawing Sheets

KITE LEADING EDGE AND SPORTS KITE

FIELD OF THE INVENTION

The invention relates to sports kites and to a leading edge for kites. In particular, the invention relates to a kite having an inflatable leading edge and to an inflatable leading edge for a kite.

BACKGROUND TO THE INVENTION

Previously, sports kites used fully curved leading edge tubes. These tubes were constructed from matching curved panels of material which were sewn together along the top and bottom edge of the panels and then inflated to form a curved leading edge tube with an arched shape from viewed from the front as in FIG. 1A. This construction formed a planar curved tube wherein a curve only occurred in one plane. The side view of the prior art leading edge tube in FIG. 1B shows that the tube is only two-dimensionally curved, specifically that the leading edge is only curved in the span-wise direction and not in the chord-wise direction. The planar tube structure of this leading edge disadvantageously restricted the shape of the wingtip. Amongst other disadvantages, this design proved difficult to relaunch from a front down position on water.

Later sports kites moved to using a segmented leading edge construction, as shown in FIGS. 2A and 2B. Segmented tubes were used to form the leading edge structure and allowed the formation of a three-dimensional curve as was not previously possible with the kites shown in FIGS. 1A and 1B. The formation of the leading edge from segmented tubes allowed for a non-planar structure and curved wingtips, as seen in FIG. 2B, to be integrated into the leading edge tubular structure. Although the segmented structure marked an improvement from the two-dimensional curvature limitations of the kite leading edges illustrated in FIGS. 1A and 1B, the segmented leading edge design had a number of disadvantages. The formation of the leading edge tube from segmented tube sections resulted in a tubular structure made of straight segments that were simply joined together. The segmented nature of the leading edge did not allow for the formation of a smooth curve around the span of the kite, but instead resulted in a series of straight line segments as seen in FIG. 2A. The absence of a smooth curve around the span of the kite is not aerodynamically ideal as the leading edge tube does not match the smooth curve formed by the canopy of the kite. Disadvantageously, this mismatch between the leading edge tube and the canopy can also encourage wrinkles in the canopy near the intersegment seams, reducing canopy stability and smoothness of the kite's flight. To overcome the problems above and to construct a smoother leading edge, the number of segmented tubes would need to be increased. Using a larger number of segmented tubes increases the sewing required for construction of the leading edge, resulting in higher construction costs and increased scope for constriction errors and shape problems.

Improved leading edges for kites, particularly sports kites, are desired.

SUMMARY OF THE INVENTION

According to the invention there is provided a kite leading edge, a sports kite and a kite as set out in any one of the appended claims.

One example embodiment is a kite leading edge that comprises a tubular structure having a first curve in a span-wise direction and a second curve in a chord-wise direction. The tubular structure is formed by a plurality of panels joined together at seams including at least a first longitudinal seam running in the span-wise direction of the tubular structure. At least a portion of the first longitudinal seam defines a first partial helical path about the circumference of the tubular structure.

One example embodiment is a sports kite that comprises the kite leading edge described above forming an inflatable leading edge having first and second wingtips and a centre between the wingtips, a plurality of inflatable struts extending rearward in a chord-wise direction from the inflatable leading edge, and a canopy attached to the leading edge and struts and projecting rearward to a trailing edge. The inflatable leading edge is curved in a span-wise direction between the wingtips and is also curved in a chord-wise direction between the centre and the wingtips and the wingtips project chord-wise to intersect the trailing edge.

One example embodiment is a kite that comprises an elongate leading edge having first and second wingtips, a centre between the wingtips, and a longitudinal axis extending along the leading edge of the wingtips; a plurality of struts extending rearward in a chord-wise direction from the elongate leading edge; and a canopy attached to the leading edge and struts and projecting rearward to a trailing edge. The elongate leading edge has a helical twist or rotation about the longitudinal axis and is curved in a span-wise direction between the wingtips and is also curved in the chord-wise direction between the centre and the wingtips.

Further aspects of the invention will become apparent from the following description which is given by way of example only.

BRIEF DESCRIPTION OF THE DRAWINGS

Preferred forms of the present invention will now be described by way of example with reference to the accompanying drawings, in which.

DESCRIPTION OF PREFERRED EMBODIMENTS

In the following claims and description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The following description is given by way of example only to illustrate the invention. It is not intended to limit the scope of use or functionality of the invention. In particular, the invention is not limited in its application to the details of construction and the arrangements of components set forth in the following description or illustrated in the accompanying drawings. Moreover, it should be understood that any phraseology and terminology used is for the purpose of description and should not be regarded as limiting on the scope of the invention.

The present invention describes a kite leading edge with a tubular structure. The tubular structure of the leading edge is constructed from a plurality of panels that form a non-planar curved tube. The plurality of panels are joined together at seams that include at least a first longitudinal seam. In a further embodiment, the plurality of panels may also be joined at a second longitudinal seam that runs in the span-wise direction of the tubular structure and is diametrically opposite the first longitudinal seam. In order to maximise the curvature of the kite leading edge, the plurality of panels may, for example, have mismatched nonrectilinear shapes that allow longitudinal seams, for example the first and second longitudinal seams, to spiral around the leading edge tubular structure following the inside and outside of the curvature and forming a non-planar tube. This construction may also be extended into the wingtip, allowing a curved wingtip to be integrated into the leading edge tube thereby improving a kite's aerodynamic qualities. In an example embodiment, the plurality of panels can achieve curvature in any direction and may be combined together to form, for example a front and back panel of the tubular structure, and can also be separated into separate panels by intersegment seams.

Figure 10:
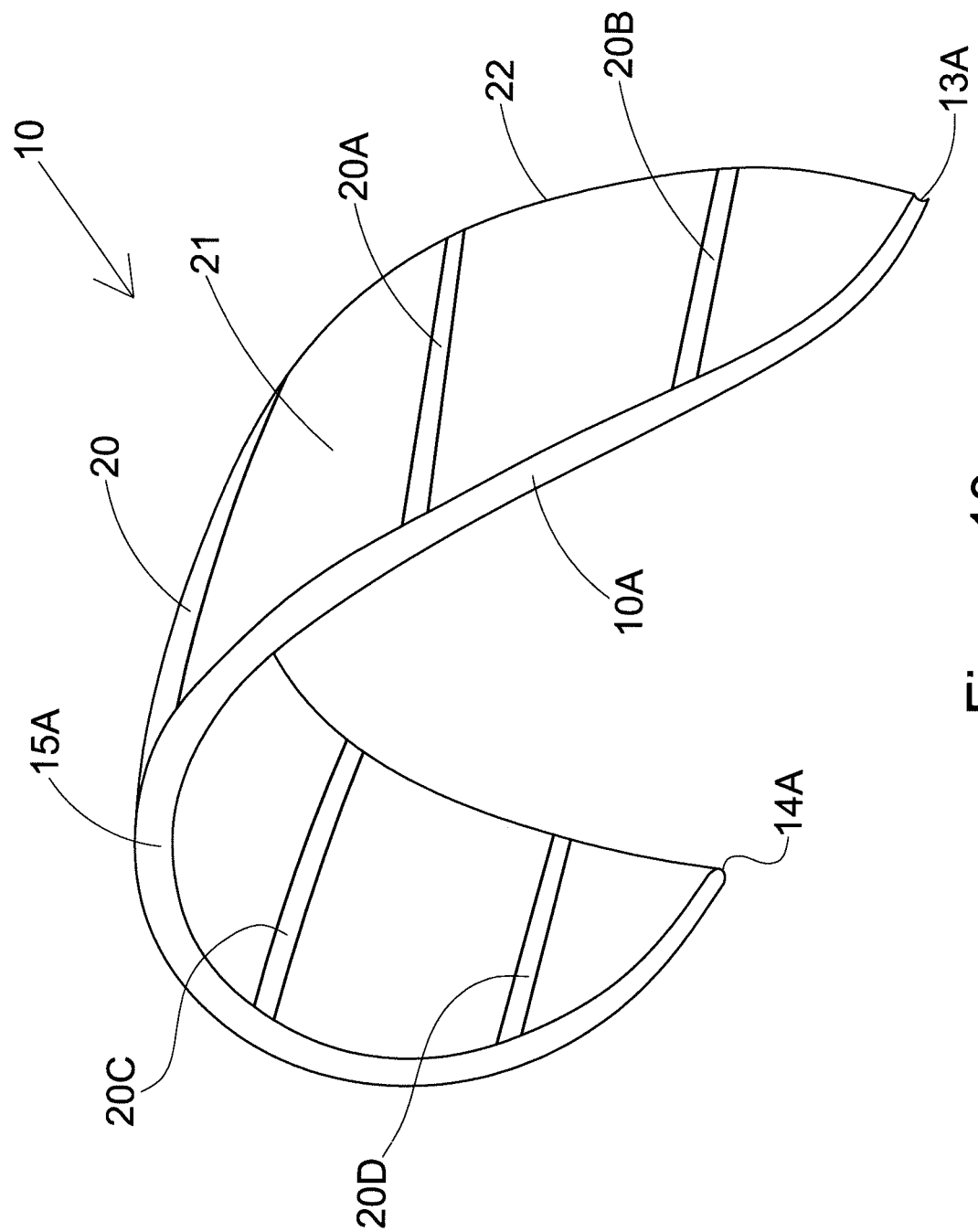
FIG. 10 is an illustration of a kite having the kite leading edge.

Referring firstly to FIG. 10, there is shown a sports kite such as that used in the sport of kitesurfing. Such kites are also commonly referred to as traction kites. The kite includes an elongate inflatable leading edge (10A) which extends in a span-wise direction (indicated by arrow 11 in FIG. 3) between first and second wingtips (13A, 14A). Between the wingtips (13A, 14A) is a central propulsive region (15A). A plurality of inflatable struts (20, 20A, 20B, 20C, 20D) extend rearward of the inflatable leading edge (10A) in a chord-wise direction (indicated by arrow 12 in FIG. 4). A canopy (21) is attached to the leading edge (10A) and to the struts (20, 20A, 20B, 20C, 20D) and projects rearward to a trailing edge (22) of the kite. The leading edge (10A), as well as being curved in a span-wise direction is also curved from its centre (15A) towards its wingtips (13A, 14A) in a chord-wise direction such that the wingtips (13A, 14A) project chord-wise at their distal ends to intersect the trailing edge (22).

In one example embodiment of the invention, the leading edge (10A) and struts (20, 20A, 20B, 20C, 20D) comprise tubular envelopes or tubes made of woven or non-woven fabric, or similar material, with inflatable bladders located in the fabric tubes. The tubes are made by sewing, gluing and/or fabric welding together a plurality of fabric panels cut to various shapes which when joined give the tubes their curved shapes. The leading edge (10A) has a compound curve in that it is curved in both the longitudinal span-wise direction and also transversely in the chord-wise direction. This compound curve is produced by shaping and joining the plurality of panels forming the leading edge (10A) to generate a helical twist or rotation of the tubular shape about its longitudinal axis between the central propulsive region (15A) and the wingtips (13A, 14A). This results in a kite with a smoother compound curve than exhibited in kites hitherto which may result in better aerodynamic qualities, improved wind stability and ease when relaunching from a front down position in water.

Referring now to FIGS. 3 through 10, the kite leading edge (10A) comprises a tubular structure (10) formed by a plurality of panels (30, 31, 32, 33, 34, 35, 36, 37, 38, 39, 40, 41) joined together at seams (50, 51, 52, 53, 54, 55, 56, 57, 58, 59, 60, 61, 62). The panels (30, 31, 32, 33, 34, 35, 36, 37, 38, 39, 40, 41) are made of woven or non-woven fabric, or of a similar type of material as known to those in the art, which are joined together along a plurality of seams (50, 51, 52, 53, 54, 55, 56, 57, 58, 59, 60, 61, 62) by one or more methods such as sewing, gluing and/or fabric welding. A first plurality of the panels (30A, 32A, 33A, 34A, 35A, 36A, 37A, 38A, 39A, 40A, 41A) form a first longitudinal half of the tube (10), and a second plurality of panels (30B, 31B, 32B, 33B, 34B, 35B, 36B, 37B, 38B, 39B, 40B, 41B) form a second longitudinal half of the tube (10). The two longitudinal halves of the tube (10) are joined together along the first and second diametrically opposite longitudinal seams (61, 62). The plurality of panels (30, 31, 32, 33, 34, 35, 36, 37, 38, 39, 40, 41) forming the leading edge tube (10) are cut to shapes that when joined together along the seams (50, 51, 52, 53, 54, 55, 56, 57, 58, 59, 60, 61, 62) generate a helical twist or rotation of the tube (10) about its longitudinal axis.

Preferably, although not essentially, this helical twist or rotation of the tube (10) about its longitudinal axis is produced by shaping the plurality of panels (30, 31, 32, 33, 34, 35, 36, 37, 38, 39, 40, 41) so that the first longitudinal seams (61, 62) running in the span-wise direction (11) of the tube (10) follow partial helical paths about the circumference of the tube (10). In particular, the twist is in a first direction (15) between the centre (15) of the tube (10) and the first end of the tube (13), and the twist is in a second direction (16) between the centre (15) of the tube (10) and the first end of the tube (14). The helical twisting or rotation of the tube produces a compound curve in the tube (10). Advantageously, the helical twisting of the tube allows the formation of a compound curve without an increase in the number of panels in the leading edge. The helically twisted tube (10) has a first curve in a span-wise direction (11), which is evident in FIG. 3, and a second curve a chord-wise direction (12) which is evident in FIG. 4. In a further example embodiment, the helical twist between the centre (15) and each of the first (13) and second (14) ends of the tube is 90-degrees. In the illustrated embodiments for example, the first longitudinal seam (61) is positioned to the top of the tube (10) at the centre (15) and twists round the circumference of the tube (10) to be located at the front edge (18) of the tube at the tube ends (13, 14). The second longitudinal seam (62) is diametrically opposite the first seam (61) and is positioned to the bottom of the tube (10) at the centre (15) and twists round the circumference of the tube (10) to be located at the rear edge (19) of the tube at the tube ends (13, 14).

Figure 9:
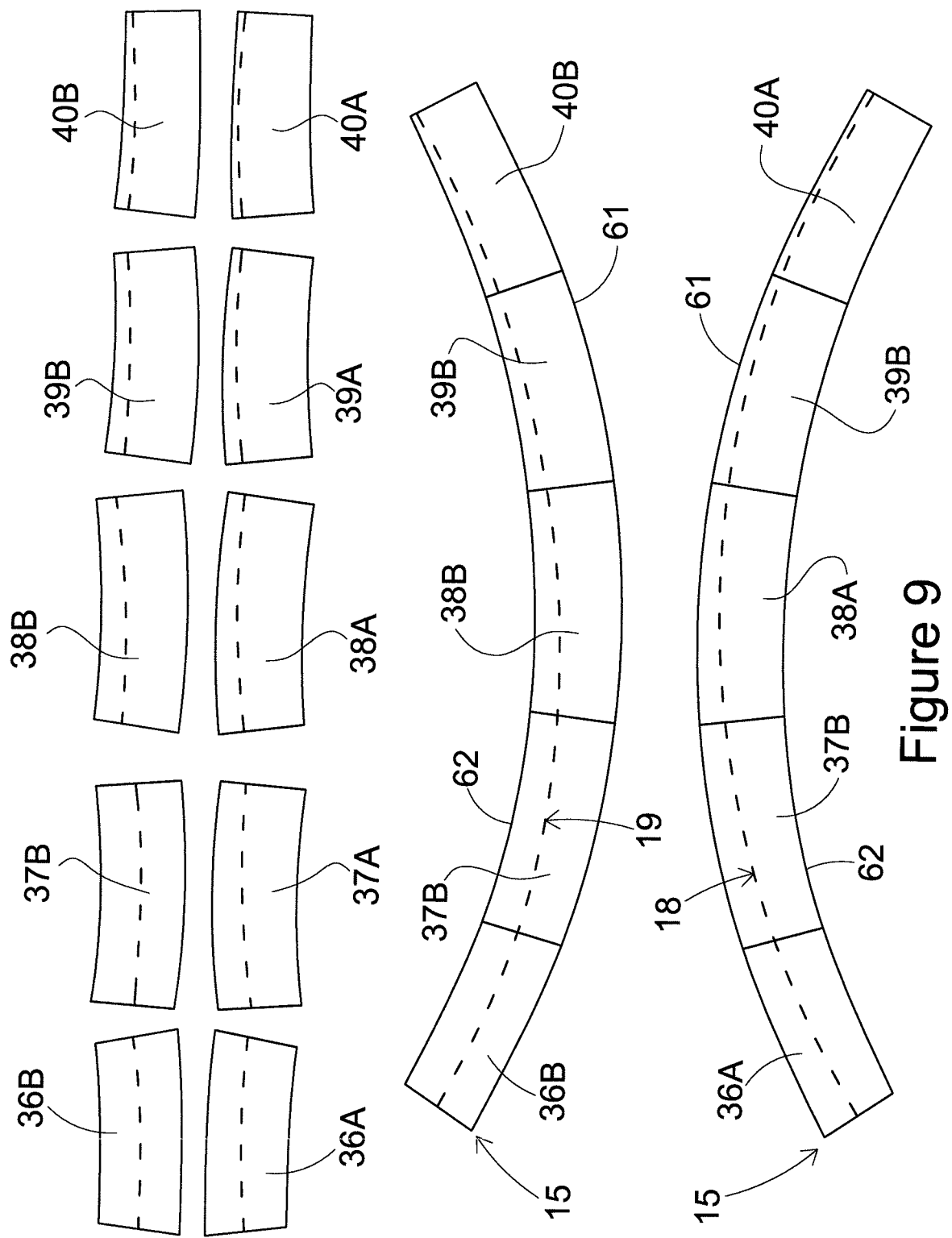
FIG. 9 is an illustration of the plurality of panels forming the kite leading edge.

FIG. 9 illustrates a plan and partial assembled views of the panels (36, 37, 38, 39, 40, 41) forming a portion of the kite leading edge. For clarity only a small portion of the edge is illustrated in FIG. 9. The portion illustrated is five panel segments (36A/36B, 37A/37B, 38A/38B, 39A/39B and 40A/40B) between the centre (15) of the tube towards one of the ends (13). The broken lines in FIG. 9 illustrate the notional front facing edge (18) and rear facing edge (19) of the tube in an inflated construction of the leading edge. It should be understood that FIG. 9 is only intended to be illustrative and does not represent an exact pattern or template for a kite leading edge.

In the above described example embodiment, the leading edge (10A) and rib struts (20, 20A, 20B, 20C, 20D) comprise tubular envelopes with inflatable bladders located in the fabric tubes. However, the invention also applies to constructions not using inflatable bladders such as a construction using air-impermeable, such as coated, flexible weldable materials that may be directly inflated without the use of internal bladders, for example in bladderless or partially bladderless kites. Constructions not employing inflatable bladders provide advantages such as reduced weight and reduced problems associated with rubbing between the bladders and the outside layer. In such alternative embodiments, tubes are made by welding and/or gluing together a plurality of air-impermeable flexible panels cut to various shapes which when joined give the tubes their curved shapes. By way of example, the air-impermeable flexible panels may comprise a synthetic material comprising a mix of carbon and polymer filaments.

In yet further embodiments the helical twist or rotation in the leading edge can be used in the entire span of the leading edge or in just a portion of the span of the leading edge in combined with a segmented or other type of leading edge construction. Additionally, amount of heliacal twist or rotation in the leading edge is not restricted to 90-degrees as in the described embodiment, but in other embodiments may be between 10-degrees and 100-degrees, and preferable between 45-degrees and 90-degrees. Selection of the location and amount of helical twist or rotation in the leading edge can be used to vary the location and amount of compound curvature in the leading edge.

In a further aspect, the invention describes a sports kite with the kite leading edge as described forming an inflatable leading edge having first and second wingtips and a centre between the wingtips, a plurality of inflatable struts extending rearward in a chord-wise direction from the inflatable leading edge and a canopy attached to the leading edge and struts and projecting rearward to a trailing edge. The inflatable leading edge is curved in a span-wise direction between the wingtips, and is also curved in a chord-wise direction between the centre and the wingtips, wherein the wingtips project chord-wise to intersect the trailing edge.

In an example embodiment, the struts may be integrated into the canopy for lighter weight and greater strength in flight. The shape of the canopy and the positioning of the struts may be varied to reduce canopy luffing and to maximise canopy stability for reduced drag.

The curved tubular structure may also be used to construct other inflatable struts within the kite, including non-planar rib struts.

Figure 1A:
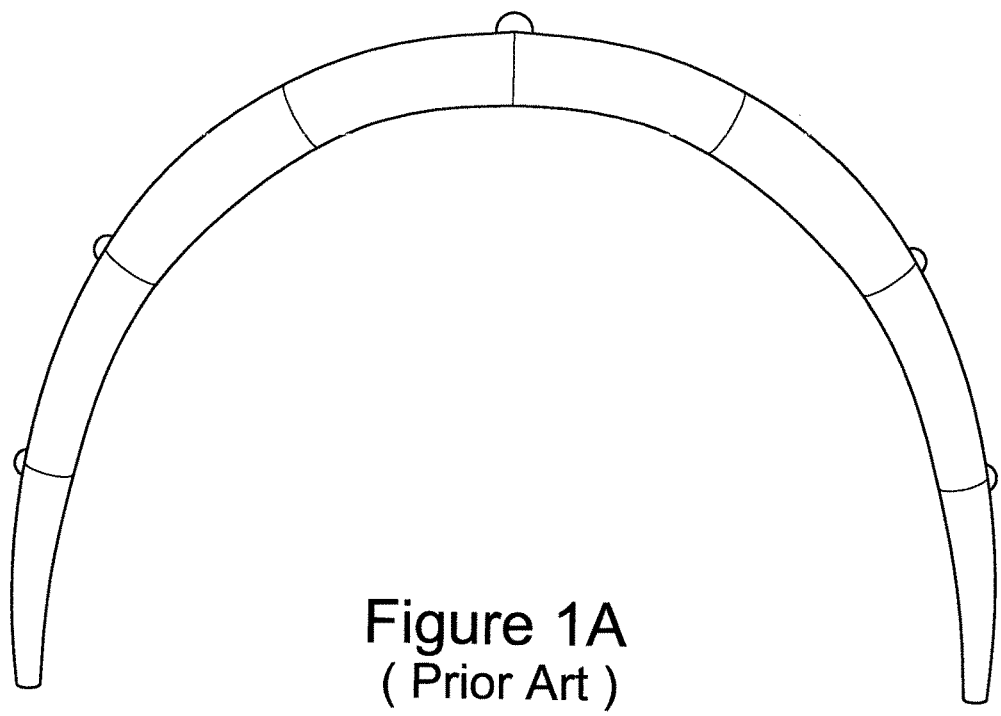
FIGS. 1A and 1B illustrate front and side views of a first prior art kite leading edge.
Figure 1B:
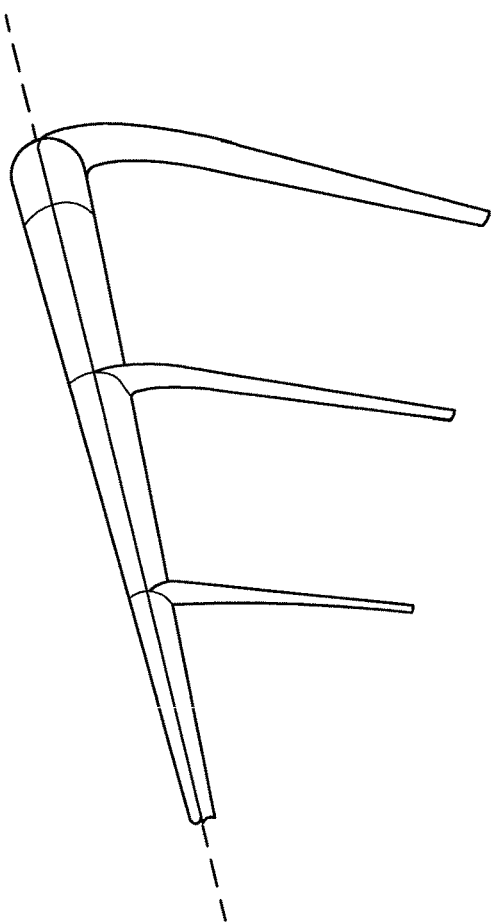
Figure 2A:
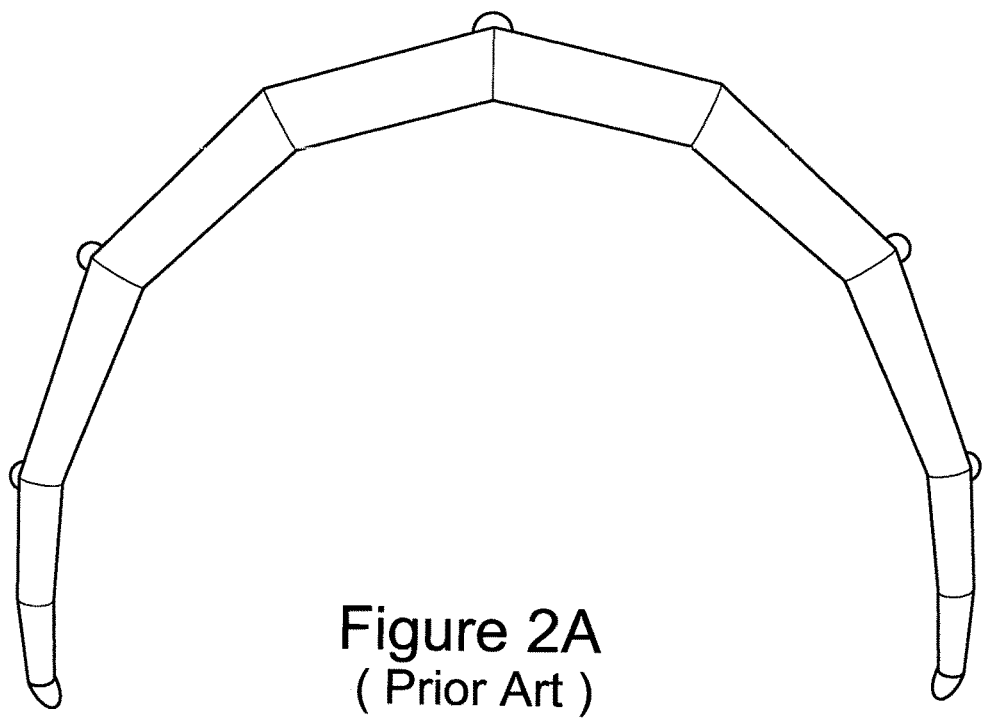
FIGS. 2A and 2B illustrate front and side views of a second prior art kite leading edge.
Figure 2B:
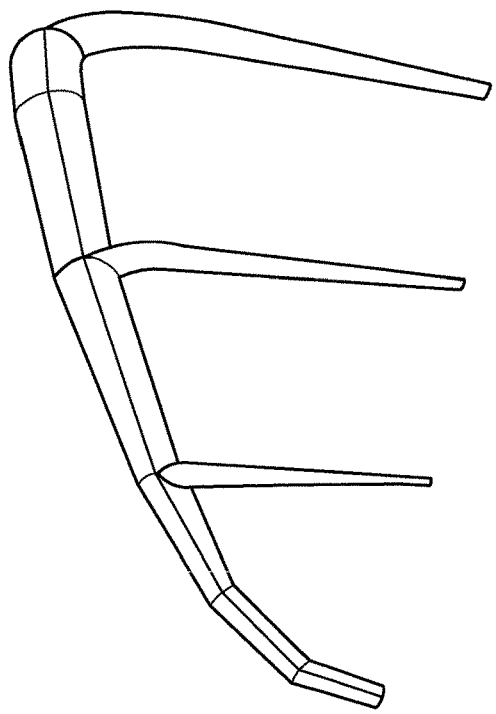
Figure 3:
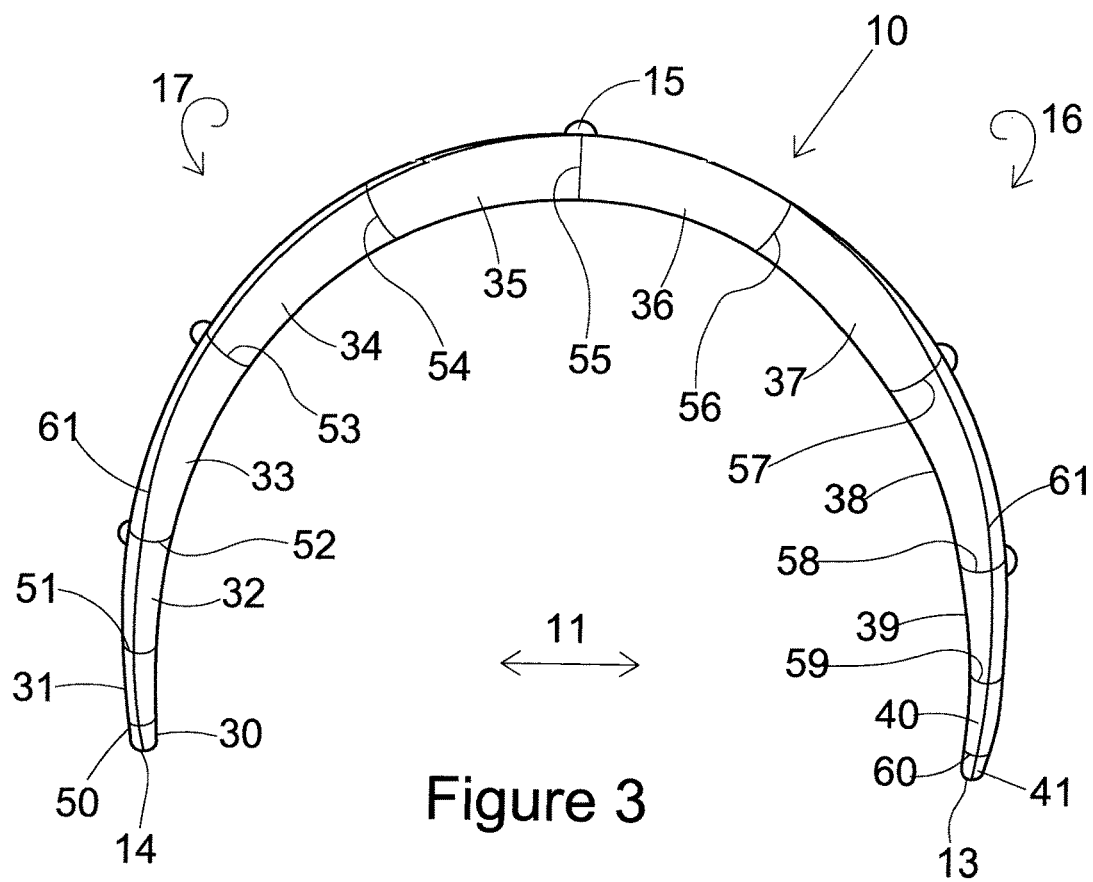
FIG. 3 illustrates a front view of a kite leading edge according to the invention.
Figure 4:
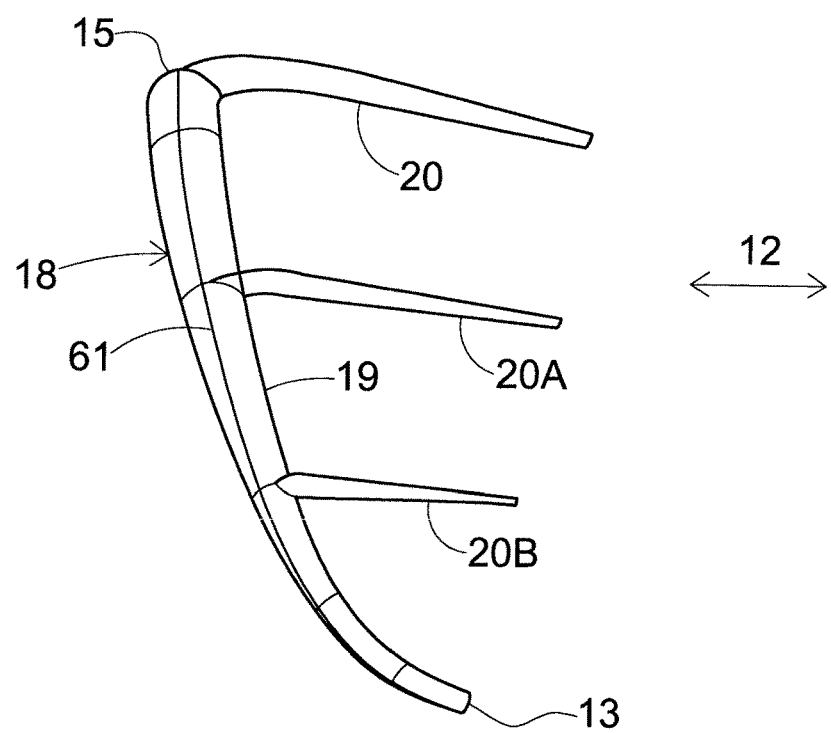
FIG. 4 illustrates a side view of the kite leading edge (the canopy has been omitted for clarity)
Figure 5:
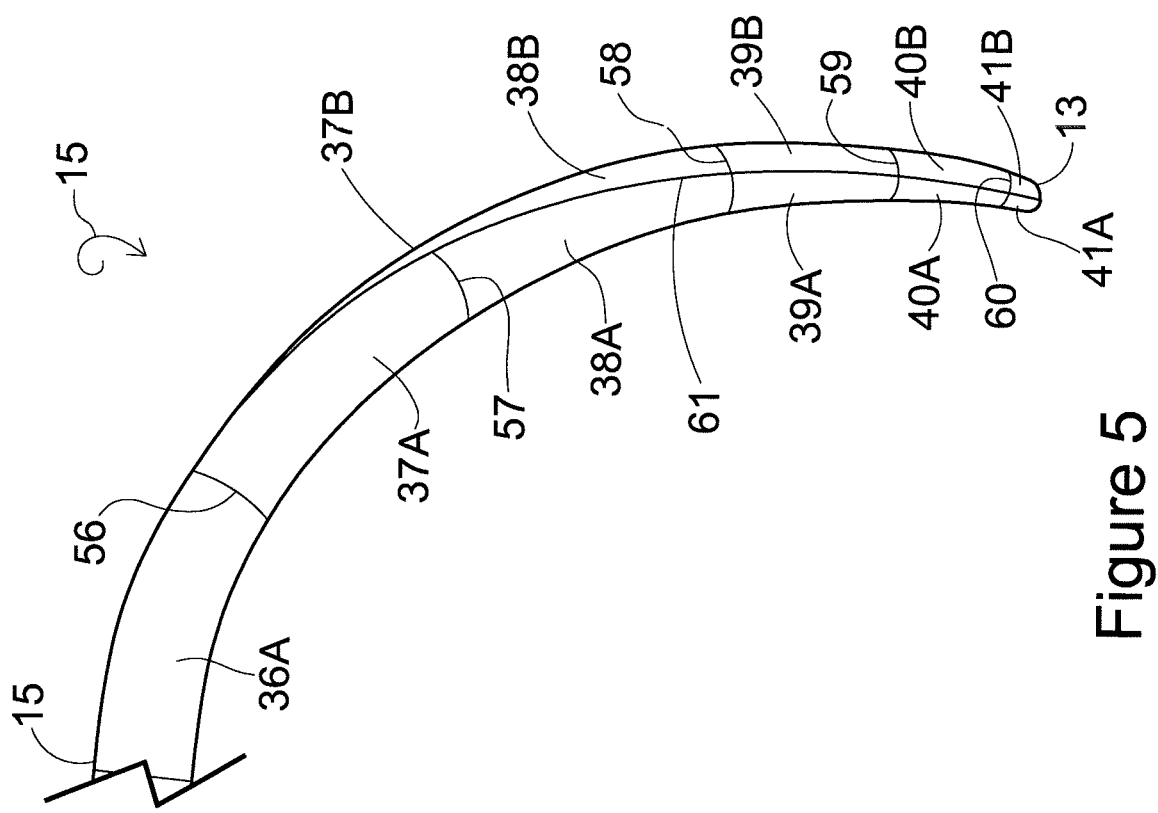
FIG. 5 is a front-view illustration of one side (the left side) of the kite leading edge.
Figure 6:
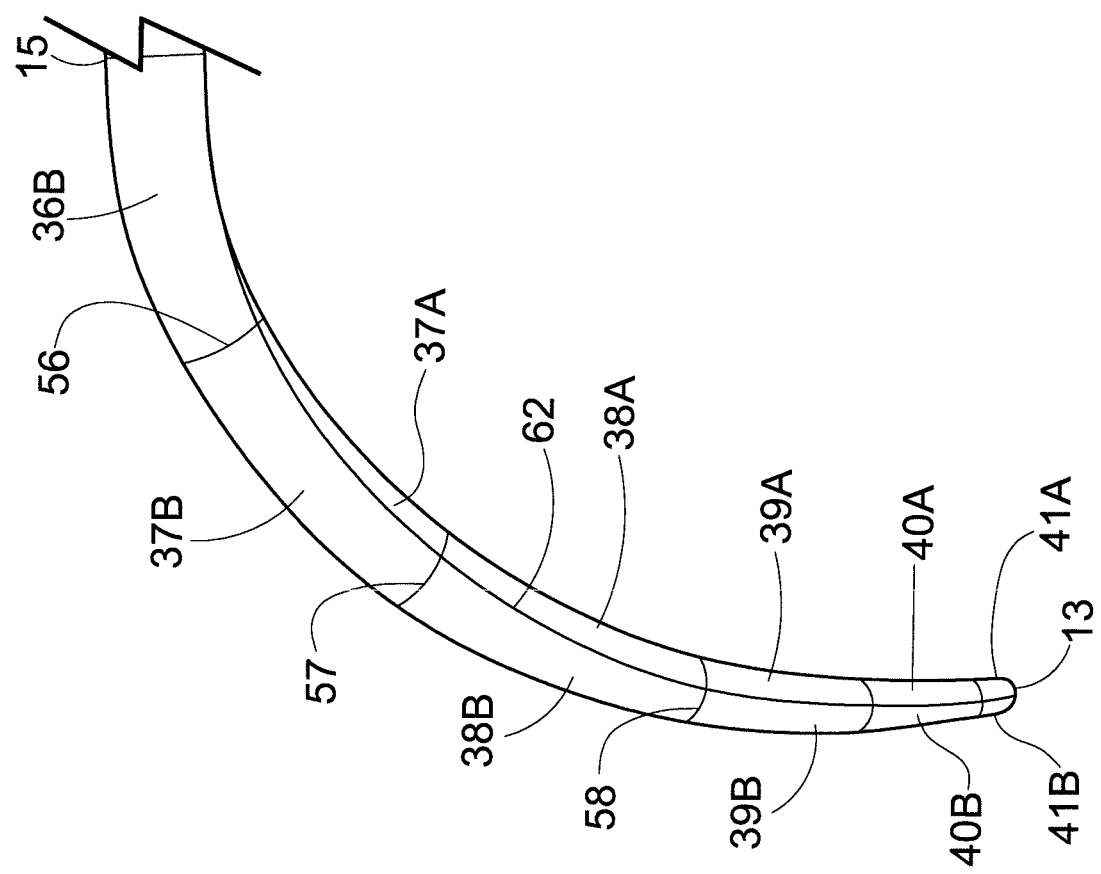
FIG. 6 is a rear-view illustration of the side (the left side) of the kite leading edge (the struts have been omitted for clarity)
Figures 7, 8:
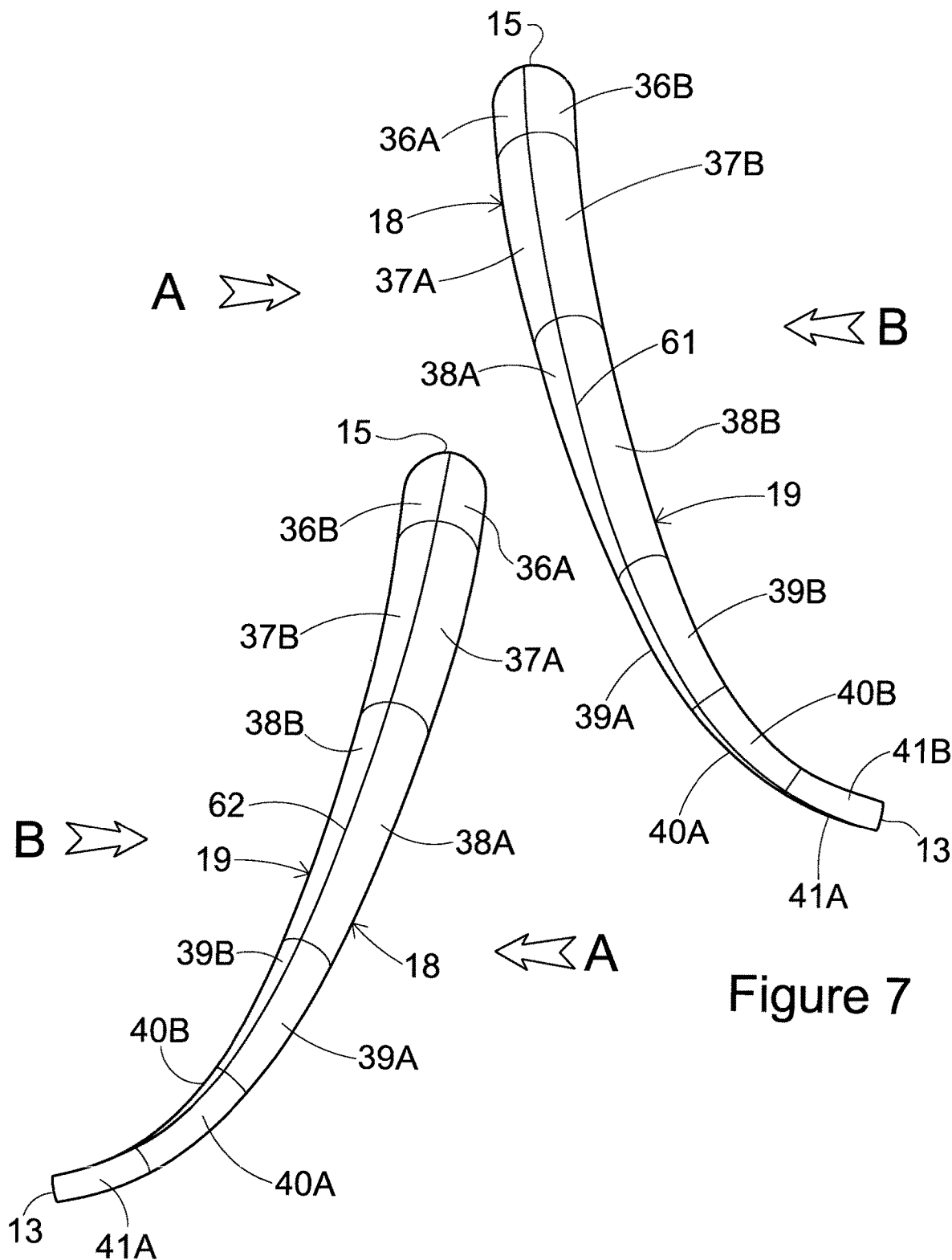
FIG. 7 is a first side-view illustration of the side (the left side) of the kite leading edge (the struts have been omitted for clarity)
FIG. 8 is an opposite side-view illustration of the side (the left side) of the kite leading edge (the struts have been omitted for clarity)

The new kite leading edge provides a number of advantages. The kite leading edge has a curved shape from the front view as seen in FIG. 3 that follows the curve of the kite canopy. This improves the aerodynamic qualities of the kite without the use of a large number of panels which increases the complexity of the construction of the kite and construction costs.

The non-planar curve of the leading edge also provides more flexibility in designing the outline shape of the kite and also allows for the integration of curved wingtips. The construction of the leading edge is easier and can allow for the use of new materials such as welded seam tubes and bladderless kites.

The tubular structure may also be constructed from a larger or smaller number of a plurality of panels without compromising the shape of the leading edge. In an alternative embodiment, the curved tubular structure may be used for part or all of the leading edge of a kite. For example, the kite may use the curved leading edge tube through most of the canopy and segmented construction for a curved wingtip.

The curved tubular structure may also be used in the construction of non-planar inflatable tubes as part of other structures, including but not limited to, inflatable tents and marquees.

The invention claimed is:

1. A kite leading edge comprising a tubular structure having a first curve in a span-wise direction and a second curve in a chord-wise direction, the tubular structure formed by a plurality of panels joined together at seams including at least a first longitudinal seam running in the span-wise direction of the tubular structure, at least a portion of the first longitudinal seam defining a first partial helical path about the circumference of the tubular structure.

2. The kite leading edge of claim 1, further comprising a second longitudinal seam diametrically opposite the first longitudinal seam, the second longitudinal seam running in the span-wise direction of the tubular structure, at least a corresponding portion of the second longitudinal seam defining a second partial helical path about the circumference of the tubular structure diametrically opposite the first longitudinal seam.

3. The kite leading edge of claim 2, wherein the plurality of panels includes a first plurality of panels forming a first longitudinal half of the tubular structure and a second plurality of panels forming a second longitudinal half of the tubular structure, and wherein the first plurality of panels is joined with the second plurality of panels along the first and second longitudinal seams.

4. The kite leading edge of claim 3, wherein the first plurality of panels are joined together along radial seams to form the first longitudinal half of the tubular structure, and the second plurality of panels are joined together along circumferential seams to form the second longitudinal half of the tubular structure.

5. The kite leading edge of claim 1, wherein the tubular structure has first and second longitudinally opposite ends and a centre between the first and second ends, and wherein the first partial helical path rotates through an angle of between 10-degrees and 100-degrees about the circumference of the tubular structure between the centre and the first and/or second ends.

6. The kite leading edge of claim 5, wherein the first partial helical path rotates in a first direction between the centre and the first end of the tubular structure and rotates in a second opposite direction between the centre and the second end of the tubular structure.

7. The kite leading edge of claim 1, wherein the plurality of panels are made of fabric or a flexible air-impermeable material, and are joined at the seams by one or more of sewing, gluing and/or fabric welding.

8. The kite leading edge of claim 7 which is inflatable without receiving an inflatable bladder with the tubular structure.

9. The kite leading edge of claim 1, wherein each of the plurality of panels has a nonrectilinear shape.

10. The kite leading edge of claim 1, wherein the tubular structure is made of fabric and is adapted to receive an inflatable bladder.

11. A sports kite comprising:
the kite leading edge of claim 1 forming an inflatable leading edge having first and second wingtips and a centre between the wingtips,
a plurality of inflatable struts extending rearward in a chord-wise direction from the inflatable leading edge,
a canopy attached to the leading edge and struts and projecting rearward to a trailing edge, and
wherein, the inflatable leading edge is curved in a span-wise direction between the wingtips, and is also curved in a chord-wise direction between the centre and the wingtips, and wherein the wingtips project chord-wise to intersect the trailing edge.

12. A kite comprising:
an elongate leading edge having first and second wingtips, a centre between the wingtips and a longitudinal axis extending along the leading edge between the wingtips,
a plurality of struts extending rearward in a chord-wise direction from the elongate leading edge,
a canopy attached to the leading edge and struts and projecting rearward to a trailing edge, and wherein
the elongate leading edge has a helical twist or rotation about the longitudinal axis, and is curved in a span-wise direction between the wingtips and is also curved in the chord-wise direction between the centre and the wingtips.

13. The kite of claim 12, wherein the helical twist or rotation is in a first direction between the centre and the first wingtip, and is in a second direction between the centre and the second wingtip, and wherein the second direction is opposite to the first direction.

14. The kite of claim 12 wherein the elongate leading edge comprises a tubular structure having a first curve in a span-wise direction and a second curve in a chord-wise direction, the tubular structure formed by a plurality of panels joined together at seams including at least a first longitudinal seam running in the span-wise direction of the tubular structure, at least a portion of the first longitudinal seam defining a first partial helical path about the circumference of the tubular structure.

15. The kite of claim 14, further comprising a second longitudinal seam diametrically opposite the first longitudinal seam, the second longitudinal seam running in the span-wise direction of the tubular structure, at least a corresponding portion of the second longitudinal seam defining a second partial helical path about the circumference of the tubular structure diametrically opposite the first longitudinal seam.

16. The kite of claim 15, wherein the plurality of panels includes a first plurality of panels forming a first longitudinal half of the tubular structure and a second plurality of panels forming a second longitudinal half of the tubular structure, and wherein the first plurality of panels is joined with the second plurality of panels along the first and second longitudinal seams.

17. The kite of claim 16, wherein the first plurality of panels are joined together along radial seams to form the first longitudinal half of the tubular structure, and the second plurality of panels are joined together along circumferential seams to form the second longitudinal half of the tubular structure.

18. The kite of claim 14, wherein the tubular structure has first and second longitudinally opposite ends and a centre between the first and second ends, and wherein the first partial helical path rotates through an angle of between 10-degrees and 100-degrees about the circumference of the tubular structure between the centre and the first and/or second ends.

19. The kite of claim 18, wherein the first partial helical path rotates in a first direction between the centre and the first end of the tubular structure and rotates in a second opposite direction between the centre and the second end of the tubular structure.

20. The kite of claim 14, wherein the plurality of panels are made of fabric or a flexible air-impermeable material, and are joined at the seams by one or more of sewing, gluing and/or fabric welding, and is inflatable without receiving an inflatable bladder with the tubular structure.

* * * * *